(12) United States Patent
Kling et al.

(10) Patent No.: US 10,208,667 B2
(45) Date of Patent: Feb. 19, 2019

(54) NOSE CONE WITH AN AFT SUPPORT RING FOR RADIAL ATTACHMENT

(71) Applicant: UNITED TECHNOLOGIES CORPORATION, Farmington, CT (US)

(72) Inventors: Colin J. Kling, Newington, CT (US); Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 343 days.

(21) Appl. No.: 15/026,692

(22) PCT Filed: May 23, 2014

(86) PCT No.: PCT/US2014/039311
§ 371 (c)(1),
(2) Date: Apr. 1, 2016

(87) PCT Pub. No.: WO2015/057271
PCT Pub. Date: Apr. 23, 2015

(65) Prior Publication Data
US 2016/0237897 A1  Aug. 18, 2016

Related U.S. Application Data

(60) Provisional application No. 61/890,637, filed on Oct. 14, 2013.

(51) Int. Cl.
| | |
|---|---|
| *F01D 5/06* | (2006.01) |
| *F02C 3/04* | (2006.01) |
| *F02C 7/04* | (2006.01) |
| *B64C 11/14* | (2006.01) |

(52) U.S. Cl.
CPC ............ *F02C 7/04* (2013.01); *B64C 11/14* (2013.01); *F01D 5/066* (2013.01); *F02C 3/04* (2013.01);
(Continued)

(58) Field of Classification Search
CPC ... F02C 7/04; F02C 3/04; B64C 11/14; B64C 11/02; F01D 5/066; F05D 2220/32; F05D 2260/31; F05D 2260/37
(Continued)

(56) References Cited

U.S. PATENT DOCUMENTS 6,447,255 B1 * 9/2002 Bagnall ............... F01D 5/066
 277/626
2005/0231052 A1   10/2005 Rockarts et al.
(Continued)

FOREIGN PATENT DOCUMENTS

| DE | 102004018585 A1 | 12/2005 |
|---|---|---|
| DE | 102005013421 A1 | 9/2006 |

(Continued)

OTHER PUBLICATIONS

DE102005013421 English Abstract.
(Continued)

*Primary Examiner* — Richard A Edgar
(74) *Attorney, Agent, or Firm* — Cantor Colburn LLP

(57) ABSTRACT

A nose cone may have a spinner including a main portion and an axially extending stepped portion. The nose cone may also have an annular aft support ring radially secured to the axially extending stepped portion. The nose cone may further include a fairing, which may be secured to the stepped portion.

16 Claims, 5 Drawing Sheets

(52) U.S. Cl.
    CPC ...... *F05D 2220/32* (2013.01); *F05D 2260/31* (2013.01); *F05D 2260/37* (2013.01)

(58) Field of Classification Search
    USPC .......................................... 415/245 R, 245 A
    See application file for complete search history.

(56) References Cited

U.S. PATENT DOCUMENTS

2009/0214354 A1    8/2009  Bagnall
2010/0215507 A1    8/2010  Breakwell

FOREIGN PATENT DOCUMENTS

EP          2458146 A1    5/2012
JP          2005105999 A  4/2005

OTHER PUBLICATIONS

DE102004018585 English Abstract.
DE102004018585 English Machine Translation.
DE102005013421 English Machine Translation.
European Search Report for Application No. EP 14 85 3438.
English Abstract for JP2005105999A—Apr. 21, 2005; 2 pgs.
International Search Report for International Application No. PCT/US2014/039311; International Filing Date: May 23, 2014; dated Oct. 27, 2014; 5 pgs.
International Written Opinion for International Application No. PCT/US2014/039311; International Filing Date: May 23, 2014; dated Oct. 27, 2014; 6 pgs.

\* cited by examiner

NOSE CONE WITH AN AFT SUPPORT RING FOR RADIAL ATTACHMENT

TECHNICAL FIELD

The subject matter of the present disclosure relates generally to gas turbine engines and, more particularly, relates to aft support rings for nose cones used in gas turbine engines.

BACKGROUND

Nose cones are attached to fan hubs of gas turbine engines. The nose cone is positioned upstream of the fan hub and provides an aerodynamic covering over the fan hub. In addition to providing an aerodynamic flow path that directs the inlet airflow smoothly through the fan, the nose cone also serves to protect against hail, bird strikes, and other possible impact damage.

Typically, nose cones are attached to the fan hub via bolted joints, with the long axis of the bolt oriented axially or at an angle (forming a conic joint) to the engine centerline. In some prior art designs, an aerodynamic fairing surrounds part of the nose cone and the bolted joints to prevent any aerodynamic disturbance that may be caused from the air flowing over the bolted joints. Axially and conically attached nose cones generally require an axial flange for attachment to the fan hub. While effective, prior art axial flange designs often involve complicated geometries, which increase time production and manufacturing costs. A radially attached nose cone, however, is of a less complex geometry and is more efficiently produced.

Accordingly, there is a need to provide a nose cone, having an aft support ring, capable of radial attachment to a fan hub of a gas turbine engine.

SUMMARY

In accordance with an aspect of the disclosure, a nose cone for a gas turbine engine is provided. The nose cone may include a substantially conical spinner having a main portion and an axially extending stepped portion. An annular aft support ring may be radially secured to the axially extending stepped portion. A fairing may be secured to the stepped portion.

In accordance with another aspect of the disclosure, the axially extending stepped portion may include a receiving joint for receiving the fairing and an interference fitting lip for receiving the annular aft support ring.

In accordance with yet another aspect of the disclosure, the annular aft support ring may include an interference fitting flange having an outer diameter that is slightly greater than an inner diameter of the interference fitting lip so that the interference fitting lip is force-fitted over the interference fitting flange creating a frictional bond, which maintains concentricity between the spinner and the aft support ring.

In accordance with still yet another aspect of the disclosure, the interference fitting lip may be further secured to the interference fitting flange with a plurality of radially extending bolts.

In further accordance with another aspect of the disclosure, the annular aft support ring may include a mounting portion so that the interference fitting flange may extend axially from the mounting portion, which may include a plurality of tabs for mounting to a gas turbine engine.

In further accordance with yet another aspect of the disclosure, the interference fitting flange may be scalloped to allow for easier deformation of the aft support ring when force-fitting the interference fitting lip over the interference fitting flange.

In further accordance with an even further aspect of the disclosure, the spinner may include a first axial stop abutting the fairing for controlling the position of the fairing relative to the spinner.

In further accordance with still an even further aspect of the disclosure, the spinner may include a second axial stop abutting the interference fitting flange for controlling the axial depth of engagement of the aft support ring into the spinner and for transferring axial loads from the spinner to the aft support ring.

In accordance with another aspect of the disclosure, a gas turbine engine is provided. The gas turbine engine may include a fan hub and a substantially conical spinner including a main portion and an axially extending stepped portion. An annular aft support ring may be radially secured to the axially extending stepped portion and may be mounted to the fan hub. A fairing may be secured to the stepped portion.

In accordance with yet another aspect of the disclosure, the annular aft support ring may include a mounting portion so that the interference fitting flange may extend axially from the mounting portion, which may include a plurality of tabs for mounting to the fan hub.

In accordance with another aspect of the disclosure, a method of forming a nose cone for radial attachment to a gas turbine engine is provided. The method entails forming a substantially conical spinner having an axially extending stepped portion with an inner diameter. Another step may include forming an aft support ring having an outer diameter that is slightly greater than the inner diameter of the stepped portion. Yet another step may include force-fitting the stepped portion over the aft support ring. Still another step may include securing the stepped portion to the aft support ring with a plurality of radially extending bolts. Still yet another step may include securing a fairing to the stepped portion.

In accordance with yet another aspect of the disclosure, the method may include forming a first axial stop on the spinner to control the position of the fairing relative to the spinner.

In accordance with still another aspect of the disclosure, the method may include forming a second axial stop on the spinner to control the depth of engagement of the aft support ring into the spinner and to transfer axial loads from the spinner to the aft support ring.

In accordance with still yet another aspect of the disclosure, the method may include scalloping the aft support ring to allow for easier deformation of the aft support ring when force-fitting the interference fitting lip over the interference fitting flange.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential", and their derivatives, are generally used with respect to the longitudinal central axis of the engine.

Figure 1:
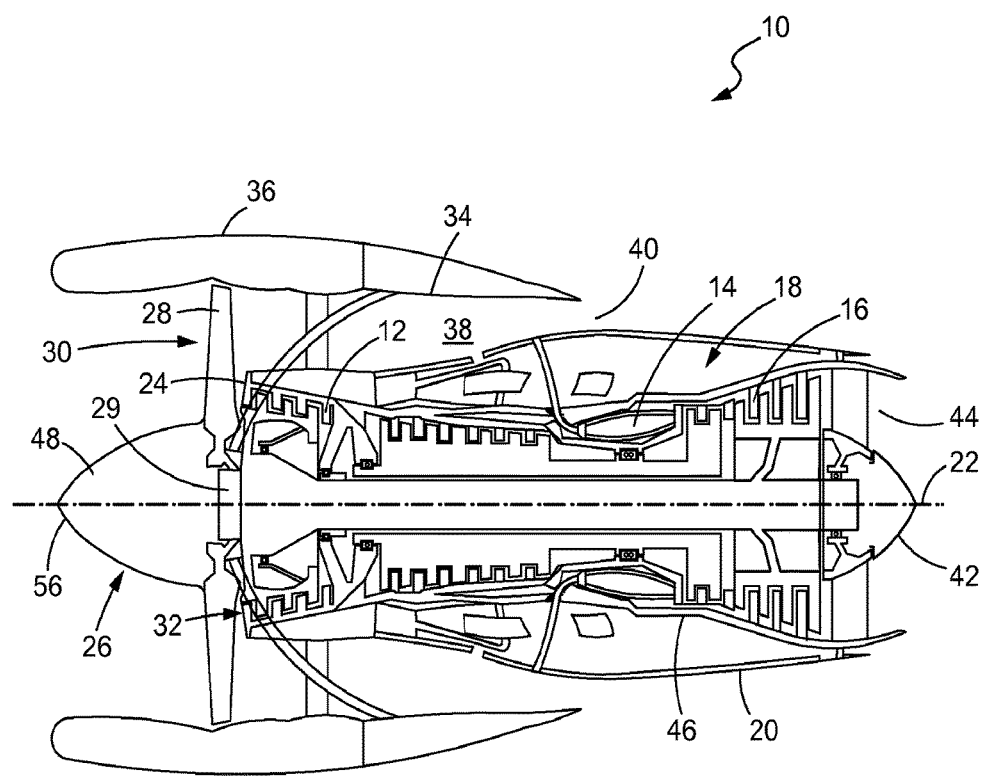
FIG. 1 is a schematic side view of a gas turbine engine with portions of the nacelle thereof sectioned and broken away to show details of the present disclosure.

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. A core engine cowl 20 surrounds the core engine 18. The engine 10 lies along a longitudinal central axis 22.

As is well known in the art, air enters compressor 12 at an inlet 24 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor 12 and a fan 26, which includes airfoils 28 mounted onto a fan hub 29. As the turbine 16 drives the fan 26, the airfoils 28 rotate so as to take in more ambient air. This process accelerates the ambient air 30 to provide the majority of the useful thrust produced by the engine 10. Generally, in modern gas turbine engines, the fan 26 has a much greater diameter than the core engine 18. Because of this, the ambient air flow 30 through the fan 26 can be 5-10 times higher, or more, than the combustion air flow 32 through the core engine 18. The ratio of flow through the fan 26 relative to flow through the core engine 18 is known as the bypass ratio.

The fan 26 and core engine cowl 20 are surrounded by a fan cowl 34 forming part of a nacelle 36. A fan duct 38 is functionally defined by the area between the core engine cowl 20 and the fan cowl 34. The fan duct 38 is substantially annular in shape so that it can accommodate the air flow produced by the fan 26. This air flow travels the length of the fan duct 38 and exits downstream at a fan nozzle 40. A tail cone 42 may be provided at the core engine exhaust nozzle 44 to smooth the discharge of excess hot combustion gases that were not used by the turbine 16 to drive the compressor 12 and fan 26. The core engine exhaust nozzle 44 is the annular area located between the tail cone 42 and a core engine case 46, which surrounds the core engine 18. The core engine case 46, as such, is surrounded by the core engine cowl 20.

Figure 2:
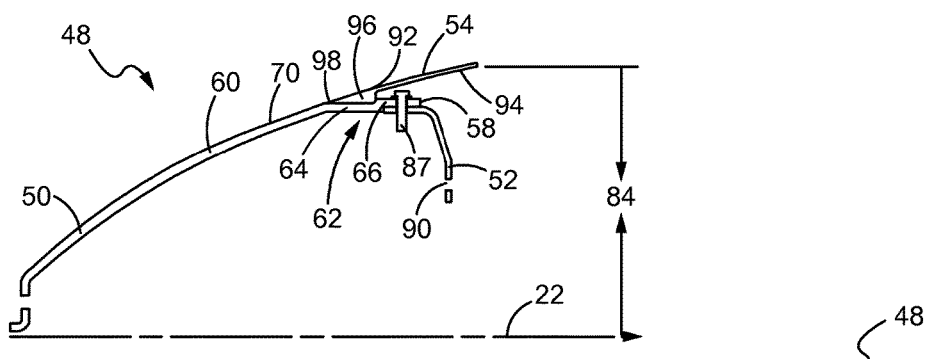
FIG. 2 is a sectional side view of a nose cone, constructed in accordance with the teachings of this disclosure.
Figure 3:
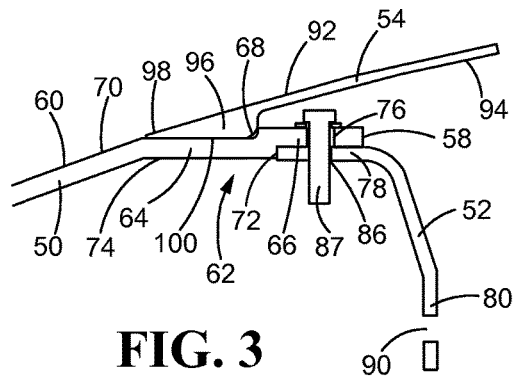
FIG. 3 is a detailed sectional side view of a nose cone of FIG. 2, constructed in accordance with the teachings of this disclosure.
Figure 4:
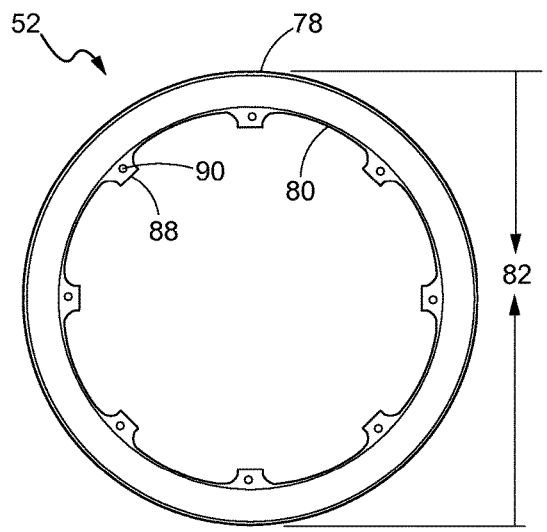
FIG. 4 is a front view of an aft support ring, constructed in accordance with the teachings of this disclosure.
Figure 5:
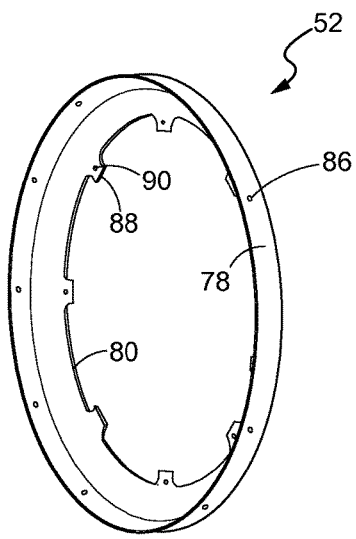
FIG. 5 is a perspective view of an aft support ring of FIG. 4, constructed in accordance with the teachings of this disclosure.

Moreover, a nose cone 48 may be secured to the fan hub 29 to provide a smooth air flow 32 into the fan 26. As best seen in FIGS. 2 and 3, the nose cone 48 may include a spinner 50, an aft support ring 52 and a fairing 54. The spinner 50 may have a substantially conical shape with an axis aligned with the longitudinal central axis 22. As such, the spinner 50 extends in a downstream axial direction from its apex 56 at an upstream end to a substantially circular base 58 at a downstream end.

The spinner 50 includes a main portion 60 and a stepped portion 62. The main portion 60 is disposed between the apex 56 and the stepped portion 62. The stepped portion 62 is disposed between the main portion 60 and the base 58. At the area where the main portion 60 and the stepped portion 62 meet, the stepped portion 62 extends in a substantially axially downstream direction and is approximately parallel to the longitudinal central axis 22. Moving axially towards the base 58, the stepped portion 62 includes a receiving joint 64 and an interference fitting lip 66. The interference fitting lip 66 is slightly offset radially away from the receiving joint 64 such that a first axial stop 68 forms on the outer surface 70 of the spinner 50 and a second axial stop 72 forms on the inner surface 74 of the spinner 50. A plurality of first bolt holes 76 is disposed through the interference fitting lip 66 such that each of the plurality of first bolt holes 76 is equally spaced circumferentially from one another around the lip 66.

Referring to FIGS. 2-5, the aft support ring 52 may be substantially annular in shape. The aft support ring 52 may be formed such that an interference fitting flange 78 extends axially from a mounting portion 80. The outer diameter 82 of the interference fitting flange 78 is slightly greater than the inner diameter (only the radius 84 is shown in FIG. 2) of the interference fitting lip 66 so that the interference fitting lip 66 is force-fitted over the interference fitting flange 78 creating a slight interference fit between the lip 66 and the flange 78. The friction caused by the interference fit secures the lip 66 to the flange 78 and also maintains concentricity between the spinner 50 and the aft support ring 52. The interference fit also transfers radial loads between the lip 66 and the flange 78. The second axial stop 72 abuts the interference fitting flange 78 to control the axial depth of engagement of the aft support ring 52 into the spinner 50, as well as to transfer axial loads from the spinner 50 to the aft support ring 52. The interference fitting flange 78 may be scalloped at several locations to facilitate assembly by allowing for easier deformation of the outer diameter 82 of the flange 78 when force-fitting the interference lip 66 over the interference fitting flange 78.

In addition, a plurality of second bolt holes 86 is disposed through the interference fitting flange 78 so that each of the plurality of second bolt holes 86 is equally spaced circumferentially from one another around the flange 78. Each of the plurality of second bolt holes 86 aligns with a corresponding first bolt hole 76 in the interference fitting lip 66 so that a radially extending bolt 87 may pass through the first and second bolt hole 76, 82 further securing the interference fitting lip 66 to the interference fitting flange 78. Although bolts are described to secure the lip 66 to the flange 78 other securing means may be used such as, but not limited to, rivets or bonding adhesives.

The mounting portion 80 of the aft support ring 52 may include a plurality of tabs 88. Each of the plurality of tabs 88 extends radially inwardly from the mounting portion 80 and is equally spaced circumferentially from one another around the mounting portion 80. Each of the plurality of tabs 88 includes a third bolt hole 90 for receiving an axially extending bolt to secure the mounting portion 80 to the fan hub 29. Alternatively, the third bolt holes 90 may be disposed directly on the mounting portion 80 without the tabs 88.

The fairing 54 is substantially frustoconical in shape with a smooth outer surface 92 and an inner surface 94. The fairing 54 is formed with a circumferential heel 96 located at its upstream end 98. The heel 96 protrudes from the inner surface 94 and includes a face 100, which is directed radially inwardly. The face 100 corresponds with and is bonded to the receiving joint 64 such that the heel 96 abuts against the first axial stop 68 to control the position of the fairing 54 relative to the spinner 50. The bonding may include, but is not limited to, adhesive, bolts and rivets. The outer surface 92 of the fairing 54 continues the smooth flow path surface of the main portion 60 of the spinner 50 and protects from fastener liberation into the flow path.

Figure 6:
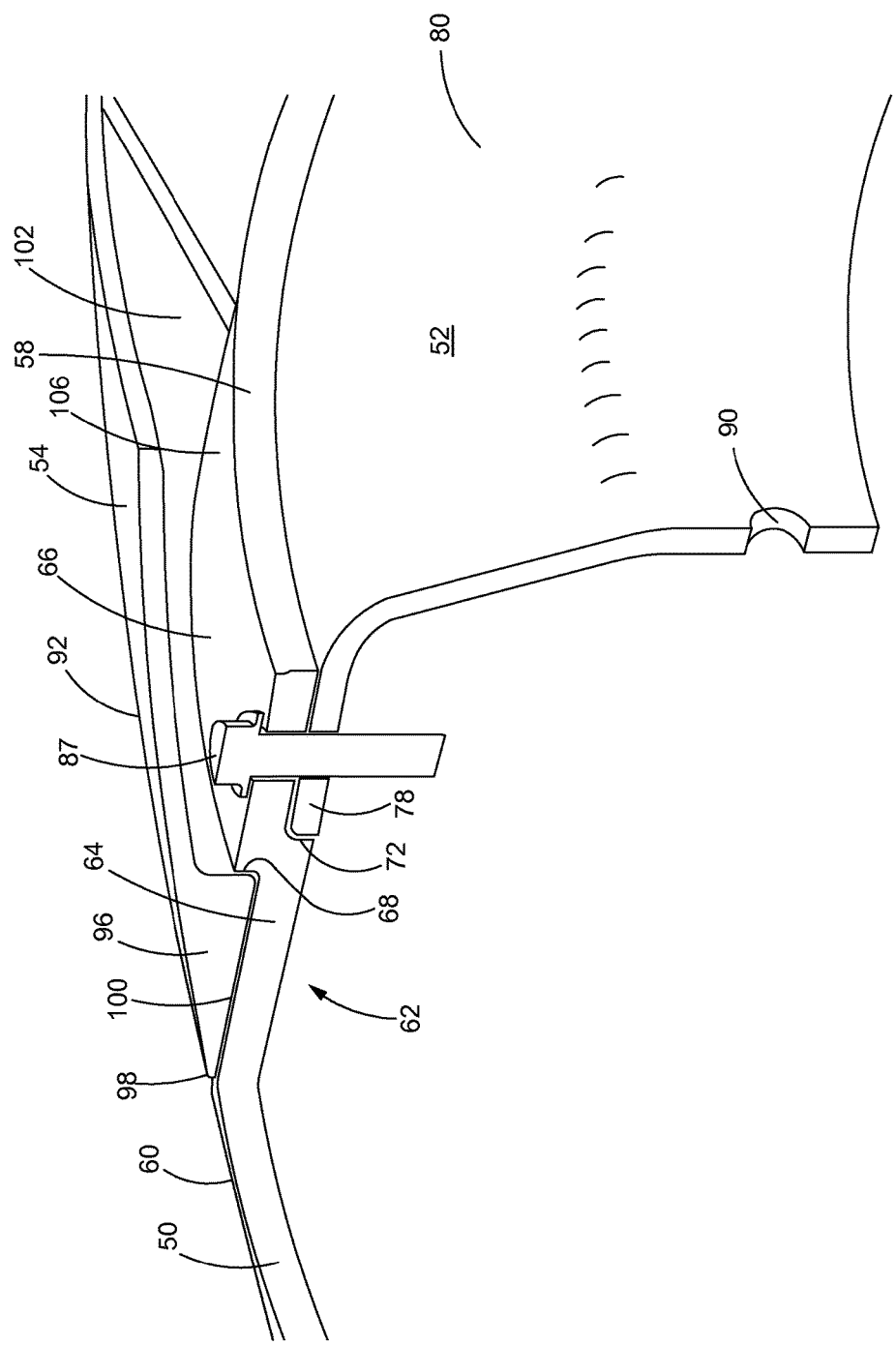
FIG. 6 is detailed perspective view of a nose cone of FIG. 3, constructed in accordance with the teachings of this disclosure.
Figure 7:
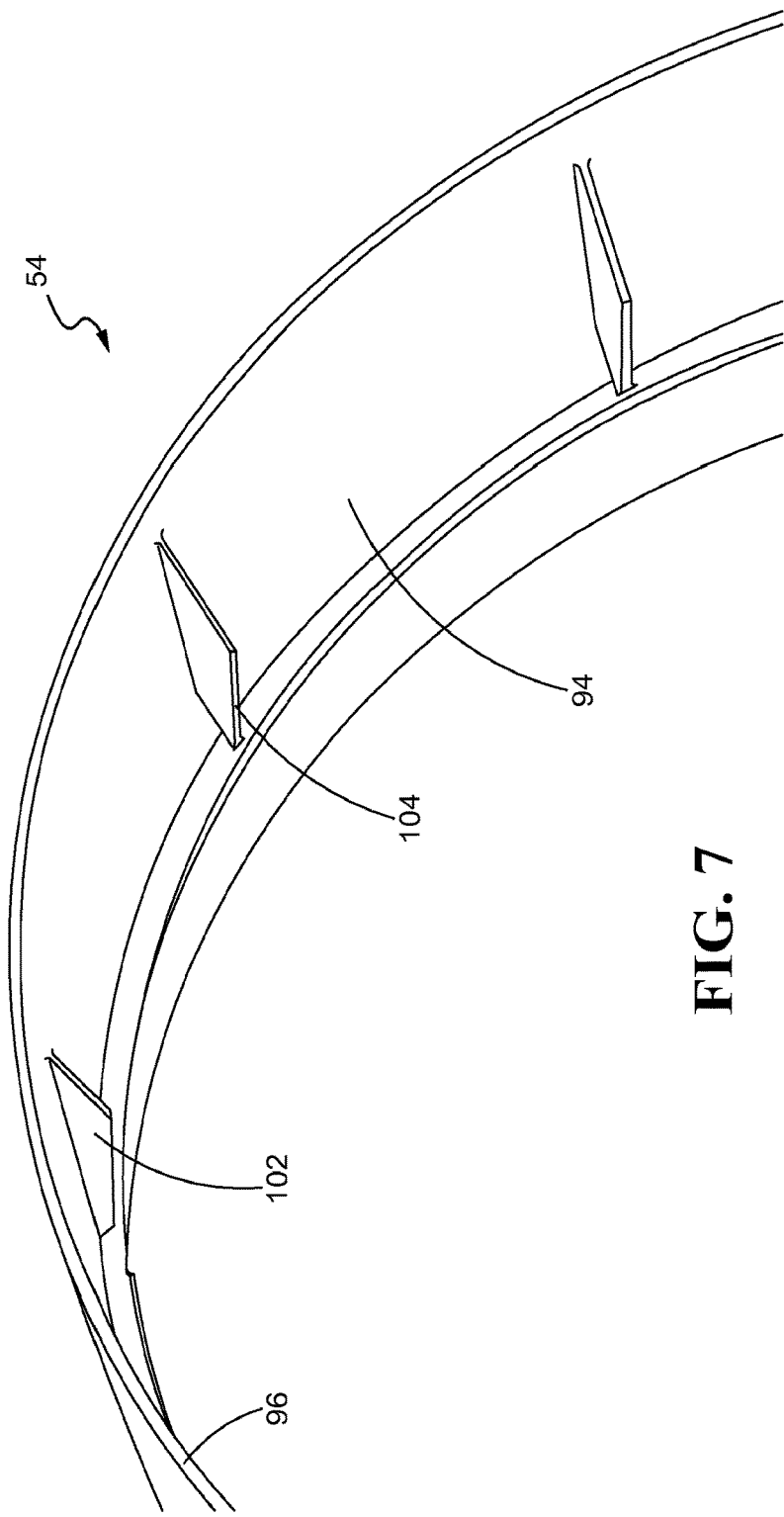
FIG. 7 a detailed perspective view of a section of a fairing, constructed in accordance with the teachings of this disclosure.

As best seen in FIGS. 6 and 7, a plurality of wedge-shaped supports 102 extends radially inwardly from the inner surface 94 of the fairing 54. Each of the plurality of supports 102 is equally spaced circumferentially from one another and includes an edge 104 that abuts the outer surface 106 of the interference fitting lip 66 at a location that is between adjacent first bolt holes 76.

The spinner 50 and the fairing 54 may be manufactured from metallic or composite materials, which are light weight yet structurally robust to withstand impact from foreign objects, thermal and centrifugal expansion and engine rotation.

Figure 8:
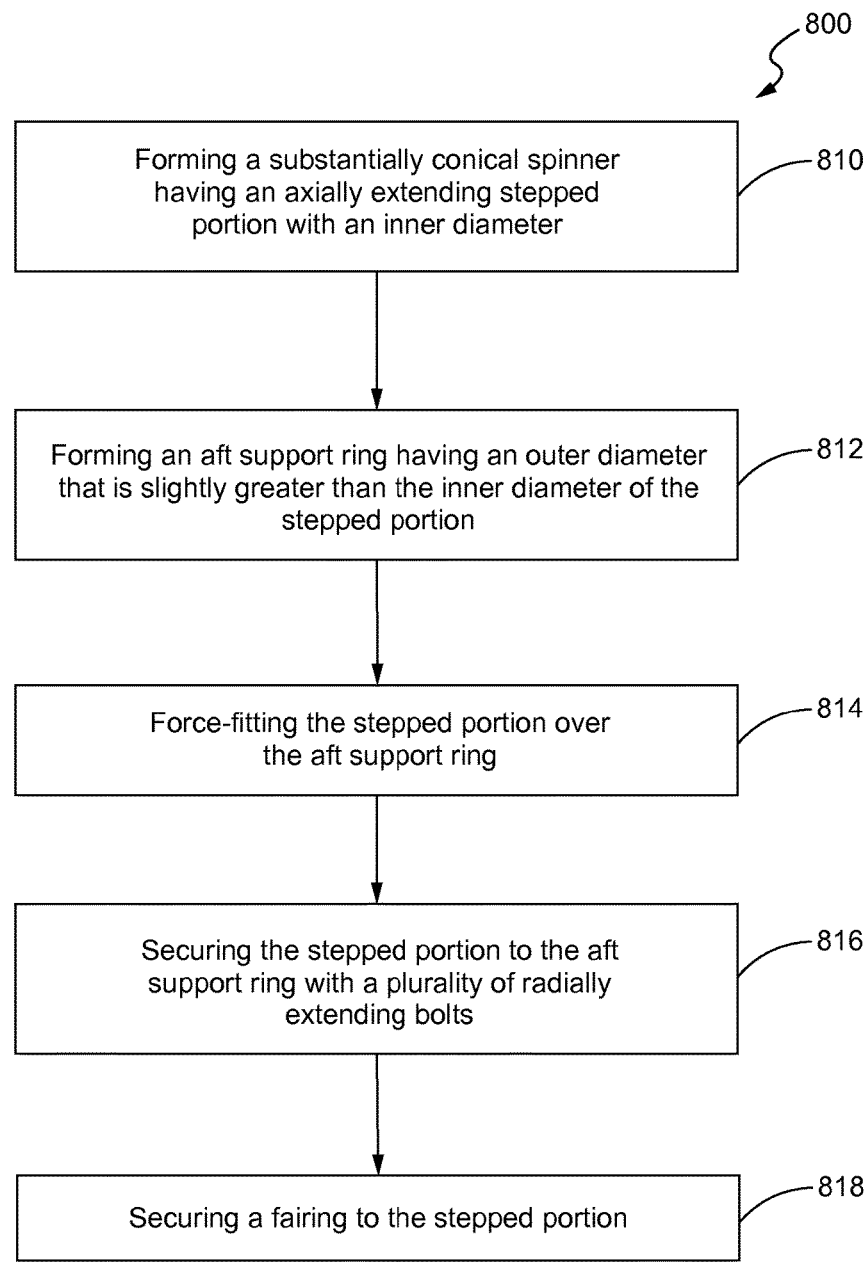
FIG. 8 is a flowchart illustrating the steps of the present disclosure.

FIG. 8 illustrates a flowchart 800 of a method of forming a nose cone for radial attachment to a gas turbine engine. Box 810 shows the step of forming a substantially conical spinner having an axially extending stepped portion with an inner diameter. Another step, shown in box 812, is to form an aft support ring having an outer diameter that is slightly greater than the inner diameter of the stepped portion. Box 814 shows the step of force-fitting the stepped portion over the aft support ring. Yet another step, as shown in box 816, is to secure the stepped portion to the aft support ring with a plurality of radially extending bolts. Box 818 illustrates the step of securing a fairing to the stepped portion.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth a nose cone with an aft support ring for radial attachment. The teachings of this disclosure can be employed to manufacture a nose cone with a less complex geometry than axial attached nose cones allowing for quicker production and assembly times. Moreover, the nose cone provides an aerodynamic flow path that directs the inlet airflow smoothly through the fan.

What is claimed is:

1. A nose cone for a gas turbine engine, the nose cone comprising:
   a substantially conical spinner, the spinner including a main portion and an axially extending stepped portion;
   an annular aft support ring, the aft support ring radially secured to the axially extending stepped portion; and
   a fairing, the fairing secured to the stepped portion, wherein the axially extending stepped portion further includes a receiving joint for receiving the fairing and an interference fitting lip for receiving the annular aft support ring and wherein the annular aft support ring further includes an interference fitting flange having an outer diameter that is slightly greater than an inner diameter of the interference fitting lip so that the interference fitting lip is force-fitted over the interference fitting flange creating a frictional bond, which maintains concentricity between the spinner and the aft support ring.

2. The nose cone of claim 1, wherein the interference fitting lip is further secured to the interference fitting flange with a plurality of radially extending bolts.

3. The nose cone of claim 1, wherein the annular aft support ring further includes a mounting portion, the interference fitting flange extending axially from the mounting portion, the mounting portion includes a plurality of tabs for mounting to a gas turbine engine.

4. The nose cone of claim 1, wherein the interference fitting flange is scalloped to allow for easier deformation of the aft support ring when force-fitting the interference fitting lip over the interference fitting flange.

5. The nose cone of claim 1, wherein the spinner further includes a first axial stop abutting the fairing, the first axial stop controls the position of the fairing relative to the spinner.

6. The nose cone of claim 1, wherein the spinner further includes a second axial stop abutting the interference fitting flange, the second axial stop controls the axial depth of engagement of the aft support ring into the spinner and transfers axial loads from the spinner to the aft support ring.

7. A gas turbine engine, comprising:
   a fan hub;
   a substantially conical spinner, the spinner including a main portion and an axially extending stepped portion;
   an annular aft support ring, the aft support ring radially secured to the axially extending stepped portion, the aft support ring mounted to the fan hub; and
   a fairing, the fairing secured to the stepped portion, wherein the axially extending stepped portion further includes a receiving joint for receiving the fairing and an interference fitting lip for receiving the annular aft support ring, and wherein the annular aft support ring further includes an interference fitting flange having an outer diameter that is slightly greater than an inner diameter of the interference fitting lip so that the interference fitting lip is force-fitted over the interference fitting flange creating a frictional bond, which maintains concentricity between the spinner and the aft support ring.

8. The gas turbine engine of claim 7, wherein the interference fitting lip is further secured to the interference fitting flange with a plurality of radially extending bolts.

9. The gas turbine engine of claim 7, wherein the annular aft support ring further includes a mounting portion, the interference fitting flange extending axially from the mounting portion, the mounting portion includes a plurality of tabs for mounting to the fan hub.

10. The gas turbine engine of claim 7, wherein the interference fitting flange is scalloped to allow for easier deformation of the aft support ring when force-fitting the interference fitting lip over the interference fitting flange.

11. The gas turbine engine of claim 7, wherein the spinner further includes a first axial stop abutting the fairing, the first axial stop controls the position of the fairing relative to the spinner.

12. The gas turbine engine of claim 7, wherein the spinner further includes a second axial stop abutting the interference fitting flange, the second axial stop controls the axial depth of engagement of the aft support ring into the spinner and transfers axial loads from the spinner to the aft support ring.

13. A method of constructing a nose cone for radial attachment to a gas turbine engine, comprising:

forming a substantially conical spinner having an axially extending stepped portion with an inner diameter;

forming an aft support ring having an outer diameter that is slightly greater than the inner diameter of the stepped portion;

force-fitting the stepped portion over the aft support ring;

securing the stepped portion to the aft support ring with a plurality of radially extending bolts; and securing a fairing to the stepped portion.

14. The method of claim 13, further including forming a first axial stop on the spinner to control the position of the fairing relative to the spinner.

15. The method of claim 13, further including forming a second axial stop on the spinner to control the depth of engagement of the aft support ring into the spinner and to transfer axial loads from the spinner to the aft support ring.

16. The method of claim 13, further including scalloping the aft support ring to allow for easier deformation of the aft support ring when force-fitting the interference fitting lip over the interference fitting flange.

* * * * *